J. Seely.
Revolving Rake.
No. 78,239.    Patented May 26, 1868.
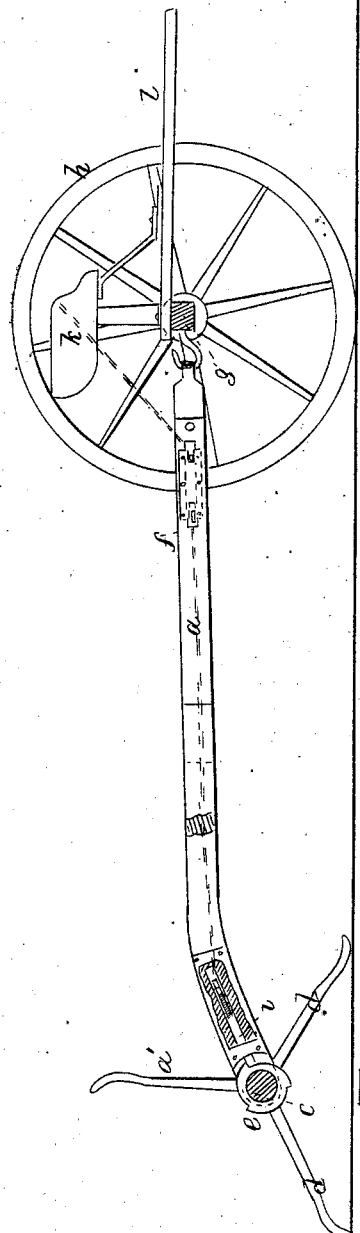
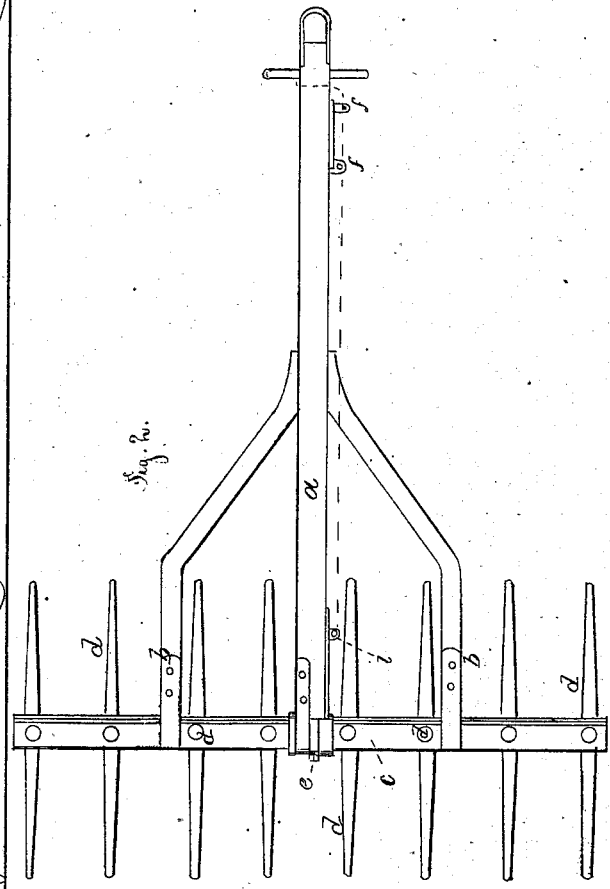

United States Patent Office.

JOHN SEELY, OF NORTH JAVA, NEW YORK.

Letters Patent No. 78,239, dated May 26, 1868.

---

IMPROVEMENT IN HORSE-RAKES.

---

The Schedule referred to in these Letters Patent and making part of the same.

---

TO ALL WHOM IT MAY CONCERN:

Be it known that I, JOHN SEELY, of North Java, in the county of Wyoming, and State of New York, have invented, made, and applied to use a certain new and useful Improvement in Revolving Rakes; and I do hereby declare the following to be a full, clear, and exact description of the said invention, reference being had to the annexed drawing, making part of this specification, wherein—

Figure 1 is a sectional side view of the rake and draught-wheels, and

Figure 2 is a plan of the rake complete, and separated from the wheels.

Similar marks of reference denote the same parts.

Revolving rakes have heretofore been made, but they have been turned over by hand, or fitted with some device, such as a lever, to throw the tines down to cause them to commence to operate, and also to effect the rotation of the rake-head, and said revolving rakes were not adapted to being drawn by hand, because their parts were such that they could not be made sufficiently light.

The nature of my said invention consists in a revolving rake formed with three ranges of teeth or tines, so that the operating-tines stand at about the usual angle of the teeth of a hand-rake, and pass under the hay and insure the proper gathering of the same.

I make the ends of the rake-teeth at such an angle or curve that they slide over the surface with but little friction, and do not plough into the earth, and a three-toothed ratchet and sliding trigger or bolt is employed to allow the rake to revolve and leave the hay in the proper place to form a row or mow.

My rake is especially adapted to use with horse-power, but light rakes of the same construction may be used to advantage, particularly on lawns, where the grass is not long and heavy, or for gleaning grain, or other light raking.

In the drawing, $a$ is a tongue or shafts, by which the rake is drawn along, $b\ b$ are the straps within which the rake-head $c$ revolves. $d\ d\ d$ are the rake-teeth or tines, arranged in three rows, and the ends of the teeth are formed at an angle or curved, as shown, so as to slide over the ground without penetrating the same.

The rake is kept from revolving by the three-toothed ratchet $e$, attached to the head $c$, taking the trigger or bolt $i$, that is fitted in the side of the tongue $a$, and operated in one direction by a spring, and in the other by a connection to the slide $f$, near the front end of said tongue.

A swinging pawl might be employed in place of the trigger or bolt $i$.

The end of the tongue is provided with a loop, that can be hooked or attached to the axle $g$, that is mounted on wheels $h$, with a driver's seat, $k$, and a tongue or shafts, $l$, for a horse.

This seat and wheels are dispensed with when the rake is drawn by hand or other power applied directly to the rake.

When the trigger $i$ is drawn back, the weight of the hay acting on the tines will cause them to revolve, bringing the next range of teeth into position for raking.

What I claim, and desire to secure by Letters Patent, is—

A revolving rake, formed of three ranges of tines, with their ends inclined or curved, as specified, so that the rake can be drawn along upon the points of two of the ranges of tines, and the forward range of tines pass at an inclination beneath the hay, as specified.

In witness whereof, I have hereunto set my signature, this 7th day of January, A. D. 1868.

JOHN SEELY.

Witnesses:
  THOMAS E. KNAPP,
  BENJAMIN F. WATSON.